Nov. 19, 1968
C. C. BLACKMAN ET AL
3,411,763
BELL TYPE FURNACE HAVING ELASTOMER FLAP TYPE SEAL
Filed Aug. 29, 1966
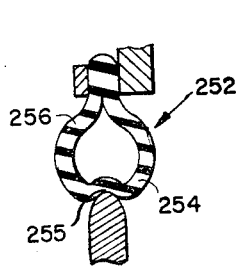
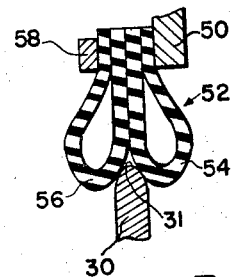
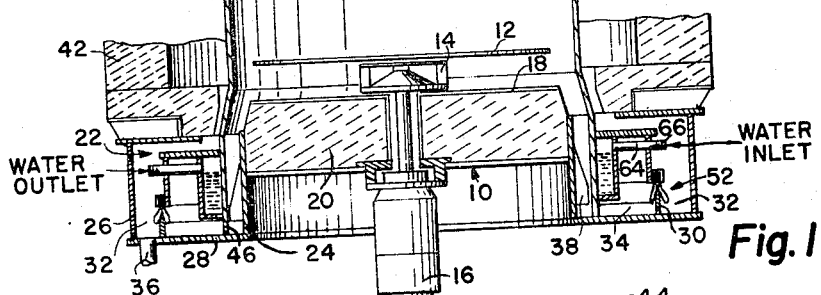
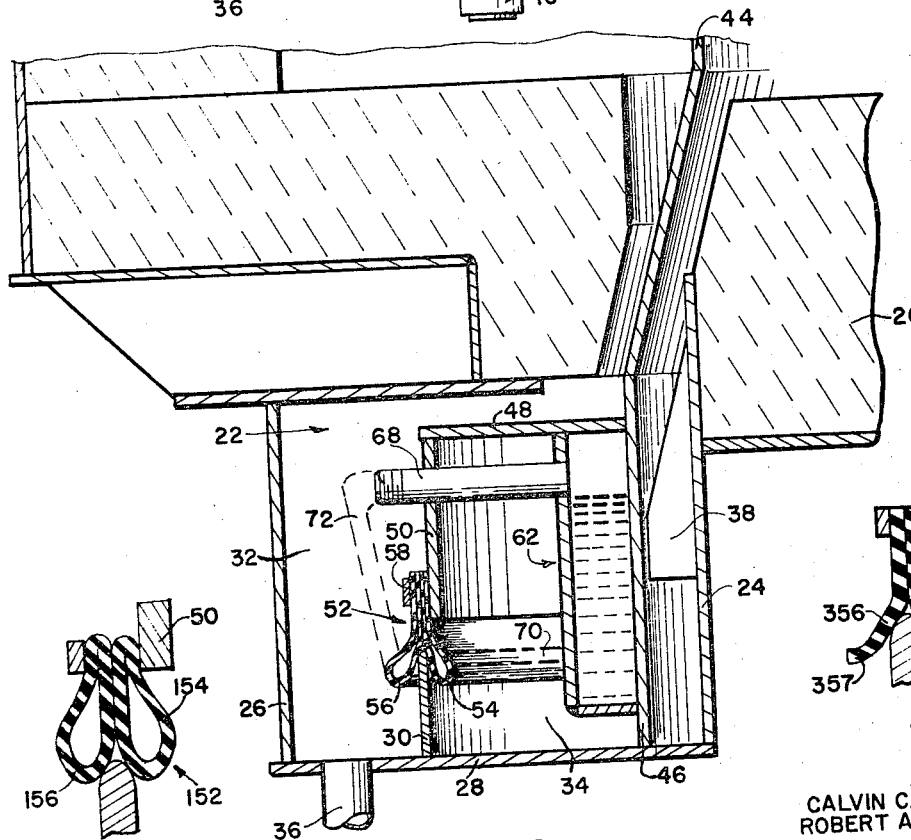
INVENTOR.
CALVIN C. BLACKMAN
ROBERT A. LETHERER United States Patent Office 3,411,763
Patented Nov. 19, 1968

3,411,763
BELL TYPE FURNACE HAVING ELASTOMER
FLAP TYPE SEAL
Calvin C. Blackman and Robert A. Letherer, Bay Village, Ohio, assignors to Rad-Con Inc., Cleveland, Ohio, a Corporation of Ohio
Filed Aug. 29, 1966, Ser. No. 575,577
10 Claims. (Cl. 266—5)

This invention relates to sealing devices and more particularly to a solid seal for a bell-type annealing furnace.

In bell-type annealing furnaces, it is necessary to provide some sort of seal around the inner cover to prevent the gaseous atmosphere used in a furnace from leaking out to the ambient atmosphere. There have been many prior art proposals for such seals all of which have certain serious drawbacks and limitations.

One of the most common prior art seals is the so-called sand seal. This takes the form of a ring of sand around the furnace base into which the lower edge of the inner cover is set. Although the sand seal does provide some protection, sand is inherently porous, and a certain amount of gas will diffuse through the sand. Additionally, the sand tends to be scattered around and collects on the charge. This is detrimental to later operations, such as strip rolling. Hence, sand has not proved to be an entirely satisfactory sealing medium.

Another common prior art sealing medium is oil or other liquid which is maintained in a trough in the base into which the bell-type inner cover is immersed. Due to the volatile and/or inflammable nature of the oil or other fluids, these seals also have not been entirely satisfactory.

There have also been some recent prior art proposals for so-called solid seals wherein a solid mass of elastomer material is used. These also have not proved entirely satisfactory due to excessive wear and deterioration due to high heat.

It is therefore a principal object of this invention to provide an improved seal for a bell-type furnace.

A more particular object of this invention is to provide an improved solid seal for a bell-type furnace which seals effectively and is free of excessive wear and deterioration under prolonged use at high temperature.

Still a further more particular object of this invention is the provision of a solid seal for a bell-type furnace utilizing a pair of elastomer flaps which are disposed to seal over an annular ring to seal the inside of the bell-type cover from the ambient atmosphere.

These and other objects together with a fuller understanding of the invention may be had from the following description taken in conjunction with the accompanying drawing in which:

FIGURE 1 is a side elevational view partially in section with parts broken away for clarity of a bell-type furnace incorporating the seal of this invention;

FIGURE 2 is a detail sectional view on an enlarged scale from FIGURE 1 showing the sealing device of this invention;

FIGURE 3 is an enlarged detail sectional view showing the relationship of the sealing flaps and the sealing ring;

FIGURE 4 is a sectional view of an elastomer seal formed from a pair of extruded tubes;

FIGURE 5 is a sectional view of an extruded, one piece, elastomer seal; and

FIGURE 6 is a sectional view of an elastomer seal where each flap is a single solid piece of material.

Referring now to the drawings a bell-type furnace is shown, having a base generally designated as 10. The base 10 includes a charge support plate 12 disposed to support a charge of material within the furnace. An impeller 14 underlies the charge plate 12 and is driven by a motor 16 to circulate gases within the furnace. A base plate 18 is disposed beneath the impeller 14 supported by insulating material 20. An annular channel 22 surrounds the insulating material 20 and is defined by an inner plate 24, an outer plate 26 and a bottom plate 28. An annular sealing ring 30 having a rounded upper surface 31, is disposed within the channel 22 and projects upwardly from the bottom plate 28 dividing the channel 22 into an outer portion 32 and an inner portion 34. A drain 36 is provided to drain the portion 32 of the channel. A plurality of circumferentially spaced guide vanes 38 are provided on the inner plate 24 and project into the channel 22 therefrom.

The furnace also includes a removable bell-type inner cover generally designated as 40 and a removable outer cover 42 which carries the heating elements and over-lies the inner cover 40.

The inner cover 40 has a dome-shaped portion 44 disposed to cover the charge resting on the charge plate 12 and a lower annular support leg 46 extending therefrom which leg is disposed to support the inner cover on the lower plate 28 of the base 10. An annular ring 48 extends radially from the support leg 46 and near the end thereof an annular rim 50 depends therefrom. The lower end of the annular rim 50 is provided with an elastomer seal generally designated as 52.

The seal 52 is comprised of a pair of elastomer strips 54 and 56 each of which is folded double to provide a pair of side by side annular loops. Although other material may be used, neoprene rubber is preferred for the strips. The folded ends of the elastomer strips 54 and 56 are secured together and secured to the end of the rim 50 by a steel band 58 pulled tightly around the strips 54 and 56 and snugly holding the strips to the rim 50. If desired, an adhesive may be applied to the strips 54 and 56 where they are folded together and also at the conjunction of the two strips where they are held together by the band 58. The elastomer strips 54 and 56 provide a pair of flaps which will normally hang in the fashion shown in FIGURE 3.

As the inner cover is lowered over the charge on the base, the guide vanes will align the seal 52 with the sealing ring 30. When the rounded edge 31 of the sealing ring 30 encounters the seal 52 as the cover is being lowered, the ring 30 will slide between the two flaps 54 and 56, the flap 54 going on the inside thereof, and the flap 56 going on the outside. When the support leg 46 comes to rest on the plate 28, the elastomer seal 52 will form a substantially gas tight seal around the ring 30 as shown in FIGURE 2 with the support leg 46 providing the principal support for the cover 40. When the cover is in this position, the coaction of the sealing ring 30 and the flaps 54 and 56 will prevent the escape of gasses from inside the cover to the ambient atmosphere.

In order to prevent the temperature from becoming too high at the seal 52, a water jacket 62 is provided around the support leg 46 of the cover 40. A water inlet pipe 64 is provided having a suitable fitting 66 to connect with a source of water. A water outlet pipe 68 is also provided which extends through the rim 50 and is disposed to discharge cooling water into the outer portion 32 of the channel. The drain 36 will drain off the water as it is received in the channel preventing any rise of water in this trough.

Normally, a cooling jacket of the type described is sufficient to prevent excessive temperatures at the seal 54. However, if the seal is hotter than desired, cooling water may be provided to the interior of either or both of the flaps 54 and 56 since the adhesive and tight band makes the interior watertight. Water may be provided by direct connection of these flaps to the water supply or connections can be made from the water jacket 62. In FIGURE 2 the dotted line 70 represents a line extending from the water jacket 62 to the interior of the flap 54 showing how this type of connection can be made and the dotted line 72 represents a line connection between the source of water and the flap 56 showing how this connection can be made. Suitable draining (not shown), is provided.

The furnace is provided with conventional atmosphere controls (not shown) which form no part of this invention and are arranged to provide gaseous atmosphere to the interior of the bell cover 40 around the charge supported on the charge plate 12. The gas within the cover 40 forces itself under pressure around the leg 46 into the inner portion 32 of the channel 22. This gas pressure creates a positive force on the flap 54 urging it into tighter sealing engagement with the annular ring 30, thus increasing the effective sealing power of the seal 52. Hence, increased pressure rather than tending to break the seal actually tends to improve it, although such pressure is not needed to maintain the seal.

Referring now to FIGURE 4 an elastomer seal 152 formed from a pair of extruded tubes 154 and 156 is shown. The tubes 154 and 156 are secured together and to the rim 50 at their upper ends and serve as sealing flaps the same as the folded strips of the previous embodiment.

Referring now to FIGURE 5, an extruded one-piece elastomer seal 252 is shown in section. The seal is generally tear drop in shape with a central indentation or depression 255 functionally dividing the seal into adjacent flaps 254 and 256. Also a hollow extruded one-piece tube without the indentation can be used, and when the seal is in use the sealing ring will functionally divide the tube into two flaps. However, some positive separation of the two such as two-piece construction or a dividing indentation is desired to align the flap for sealing on both sides of the ring.

The extruded type one-piece seal is easy to water cool since the interior of the seal is a unitary opening as opposed to two non-connected openings of the previously described embodiments.

Referring now to FIGURE 6, still another embodiment of the seal of this invention is shown. In this embodiment, a pair of solid flaps 354 and 356 are provided which are secured together and to the rim 50 at their upper ends. The lower ends of the flaps 355 and 357 flare outwardly from each other to allow for the reception of the sealing ring when the cover is being lowered into place. In this embodiment the inherent internal resiliency of the material causes the sealing action.

In the preferred embodiment the sealing flaps are shown attached to the inner cover and sealing ring attached to the base; however, it will be appreciated that this arrangement could be reversed with the sealing flaps attached to the base and projecting upwardly and the sealing ring attached to the cover and projecting downwardly between the flaps. Although this type of arrangement has the advantage of placing the flaps on the nonmovable portion of the furnace thus lowering the risk of damage to them during movement, it has the disadvantage of providing an upwardly projecting crevice which will collect dirt and debris and may tend to lessen the effectiveness of the seal to some extent. This arrangement, however, may be desirable under certain conditions. It will also be appreciated that the guide vanes which in the preferred embodiment are shown attached to the base could be attached to the support leg of the cover and project inwardly and guide against the plate 24 or project outwardly and guide against the ring 30, or plate 26.

One of the outstanding advantages of this invention is that a solid seal is provided which affords an effective seal against gas leaking from within the furnace to the atmosphere and in fact becomes more effective as gas pressure within the furnace increases. The seal may be easily constructed and easily replaced. It is formed of relatively inexpensive materials, and is quite rugged. It will not interfere with the operation of the furnace by releasing volatile matter into the furnace during use as liquid seals do, nor does it utilize abrasive particles which may contaminate the charge. It also does not wear excessively during normal and continued use and if wear does occur it can be easily repaired or replaced.

Although several embodiments of the invention have been described, various adaptations and modifications thereof can be made without departing from the scope of the appended claims.

We claim:
1. In a bell-type furnace including a base member for supporting a charge and a cover member for covering the charge, an improved gas seal comprising a pair of annular resilient, elastomer flaps projecting from one of said members, the other of said members having an annular ring projecting between said flaps and sealing thereagainst when said cover member is positioned over said charge and supported by said base.

2. The seal of claim 1 wherein said flaps project downwardly from the cover member and the ring projects upwardly from the base member.

3. The device of claim 1 further characterized by cover centering means carried by one of said members to align said flaps with said ring.

4. The device of claim 3 wherein said centering means includes a plurality of fins projecting from said base member.

5. The seal of claim 1 wherein each of said flaps is defined by multiple layers of elastomer material.

6. The seal of claim 5 wherein each of said flaps is defined by a folded strip of elastomer material.

7. The seal of claim 6 further characterized by means securing said flaps together adjacent their adjoining folded edges.

8. The seal of claim 5 wherein said flaps are defined by tube means.

9. The seal of claim 8 wherein said tube means include a pair of tubes secured together.

10. The seal of claim 8 wherein the flaps are defined by a one-piece tube having means functionally dividing the tube into adjacent flaps.

References Cited
UNITED STATES PATENTS

| 2,556,962 | 6/1951  | Field         | 266—5    |
| 2,657,475 | 11/1953 | Erickson      | 34—242 X |
| 2,834,590 | 5/1958  | Pugh          | 266—5 X  |
| 2,964,307 | 12/1960 | Van Dine      | 263—40   |
| 3,047,187 | 7/1962  | Taylor et al. | 34—242   |
| 3,179,394 | 4/1965  | Sims et al.   | 266—5 X  |
| 3,188,068 | 6/1965  | Schmidt       | 266—5    |

FOREIGN PATENTS

| 213,100 | 7/1956  | Australia.     |
| 858,417 | 12/1952 | Germany.       |
| 583,152 | 12/1946 | Great Britain. |

J. SPENCER OVERHOLSER, *Primary Examiner.*

R. S. ANNEAR, *Assistant Examiner.*